Feb. 13, 1923.
J. SLIPPER.
FILM SPLICING MACHINE.
FILED MAR. 31, 1920.
1,445,045.
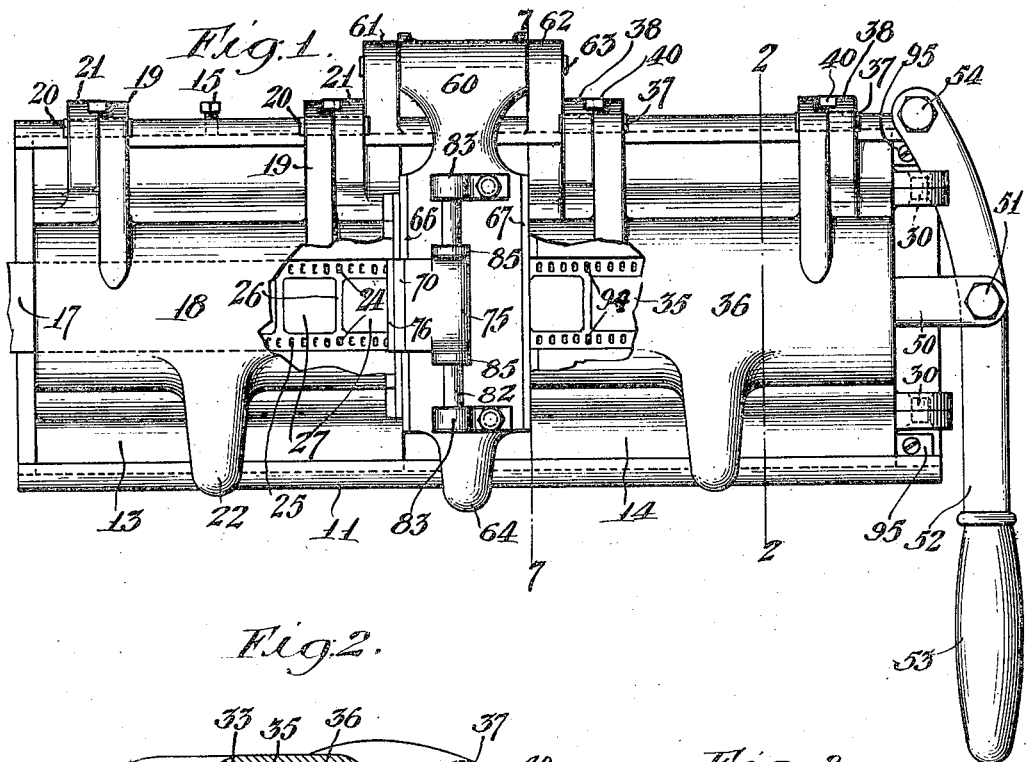
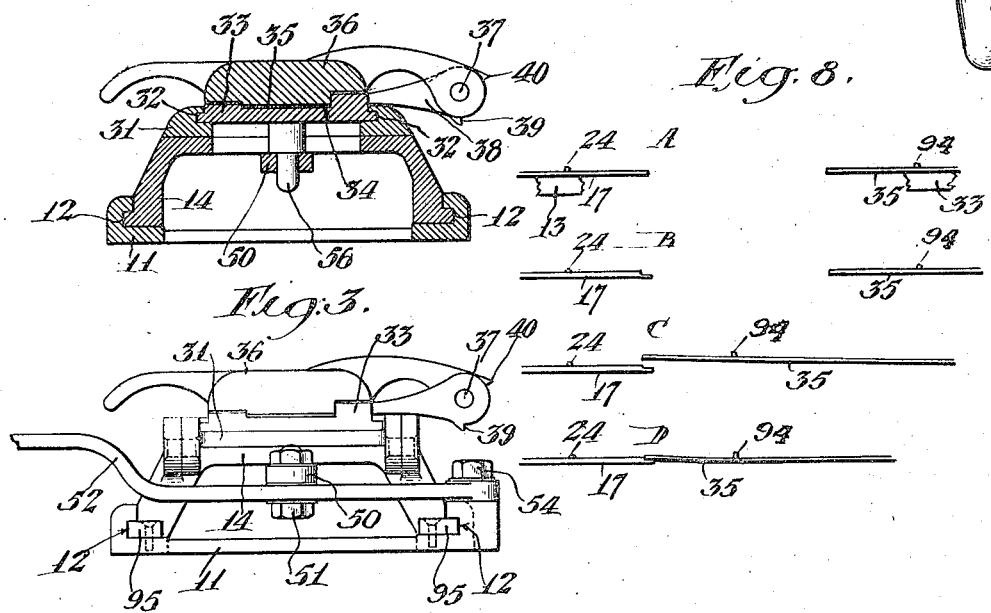
Inventor
James Slipper Feb. 13, 1923.  
J. SLIPPER.  
FILM SPLICING MACHINE.  
FILED MAR. 31, 1920.  
1,445,045.  
2 SHEETS—SHEET 2.
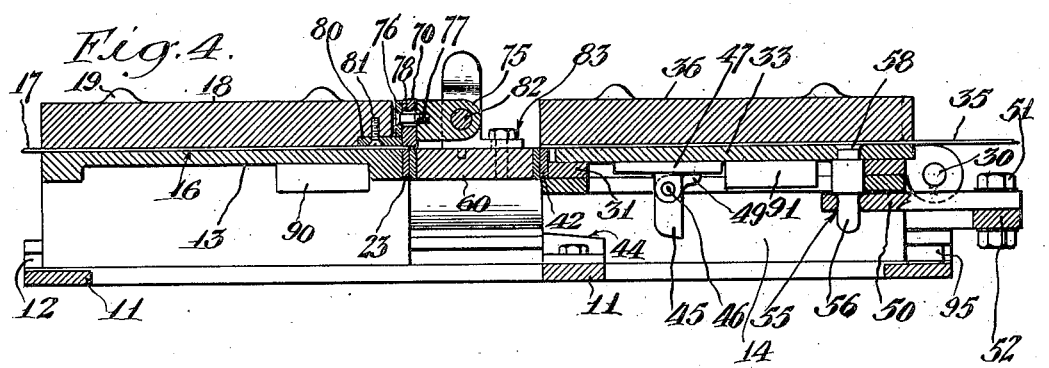
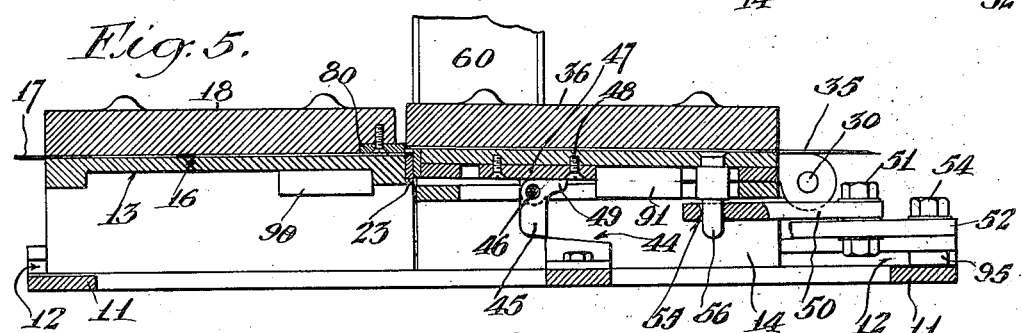
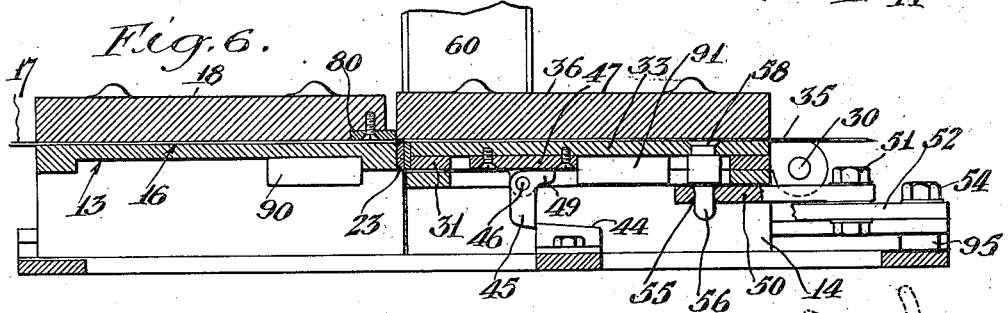
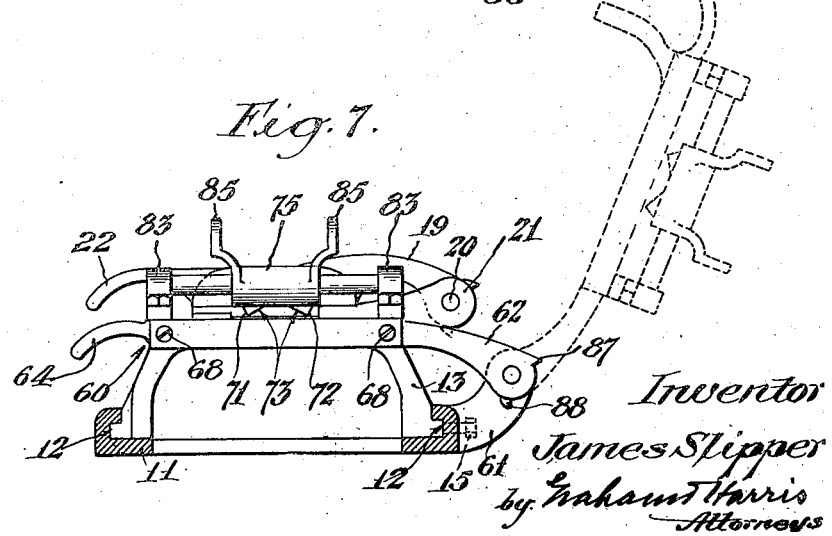

Patented Feb. 13, 1923.

1,445,045

UNITED STATES PATENT OFFICE.

JAMES SLIPPER, OF LOS ANGELES, CALIFORNIA.

FILM-SPLICING MACHINE.

Application filed March 31, 1920. Serial No. 370,293.

*To all whom it may concern:*

Be it known that I, JAMES SLIPPER, a citizen of the United States, residing at Los Angeles, in the county of Los Angeles and State of California, have invented a new and useful Film-Splicing Machine, of which the following is a specification.

My invention relates to the art of motion pictures, being more particularly a machine for splicing film. In the production and exhibition of motion picture films it is frequently necessary to cut the film and splice the cut ends of the film together. This happens generally in the production of films when the film is being made up from a number of pieces of film containing different scenes, the scenes having been taken separately upon different pieces of film. In the distribution of film by the various distributors the film is always examined when it is returned to the distributor from the exhibitors, and in many cases portions of the film are damaged, which necessitates the cutting out of the damaged portions and the splicing of the film before it is used again.

The principal object of my invention is to produce a simple form of film splicing machine by means of which the film may be cut and quickly spliced.

Other objects and advantages will appear hereinafter from the following specification.

Referring to the drawings, which are for illustrative purposes only.

Fig. 1 is a plan view of a machine embodying a form of my invention, a portion of the machine being broken away to illustrate the position of the film in the machine.

Fig. 2 is a vertical sectional view on line 2—2, Fig. 1.

Fig. 3 is an end view of the machine.

Fig. 4 is a longitudinal sectional view of the machine showing the parts in position for scraping the film.

Fig. 5 is a longitudinal sectional view similar to Fig. 4 showing the parts of the machine in the position assumed when the two ends of the film are about to be joined.

Fig. 6 is a longitudinal sectional view showing the parts in the position assumed when the splicing operation is completed.

Fig. 7 is a vertical cross-sectional view on line 7—7, Fig. 1, and

Fig. 8 is a diagrammatic illustration of the ends of the films showing their relative positions during the splicing operation.

The machine comprises a base plate 11 which may be secured in any suitable manner to a table, bench or other supporting device. The base plate 11 is provided with ways 12 in which is mounted a stationary head 13 and a movable head 14. The stationary head is adjustable in the base plate with relation to the cutting mechanism to be hereinafter described, but is normally held in fixed relation to the base plate by means of a set screw 15 mounted in the base plate, the inner end of the screw engaging the stationary head.

The stationary head 13 is provided with a longitudinally extending groove 16 forming a film guide arranged to receive a strip of film indicated at 17, the upper face of the film being substantially in the same plane as the upper face of the stationary head. Provision is made for holding the film in the film guide which consists of a film clamp or holder 18, such clamp having arms 19 which are pivotally mounted by means of a pin 20 on ears 21 formed on the head 13. The clamp 18 is provided with a handle or grip 22 by means of which the clamp may be swung upwardly on the pivots 20. Secured to the inner end of the head 13 is a stationary shear plate 23, and for the purpose of correctly positioning the film with relation to the cutting line the head 13 is provided with two pins 24 which extend upwardly and engage the perforations 25 in the edge of the film, the film being placed upon the pins so that the pins engage the perforations in the film on a division line 26 between two scenes indicated at 27 on the film.

Pivotally mounted to one end of the movable head 14 by means of a pin 30 is a bed plate 31, the bed plate resting upon the upper face of the head 14 when in lower position. The bed plate 31 is provided with ways 32 in which is slidably mounted a film holder 33 which film holder is provided in its upper face with a longitudinally extending groove 34 for receiving one end 35 of the film. The film is held on such holder by means of a film clamp 36 pivotally mounted by means of pins 37 to the film holder 33, the film holder 33 having ears 38 for holding the pins 37 and being also provided with a stop 39 which is engaged by a spur 40 on the film clamp to limit the swinging movement of the film clamp on the film holder. Secured to the inner end of the bed plate by means of screws or in any suitable manner is a stationary shear plate 42.

For the purpose of raising the film holder as it reaches the end of its stroke a cam 44 is provided secured in any suitable manner to the base plate 11, which cam is arranged to be engaged by a follower 45 pivotally mounted by means of a pin 46 to a bracket 47, which bracket is secured by means of screws 48 to the film holder 33, a detent 49 being formed on the follower 45 so as to limit the swinging movement of the follower on the pin 46 for the purposes hereinafter described.

The head 14 and the parts carried thereon, that is, the bed plate 31, the film holder 33 and the clamp 36, are moved longitudinally in the machine by means of a link 50 which is pivotally mounted by means of a bolt 51 to an operating lever 52 provided with a handle 53 and pivoted at one end by means of a bolt 54 to the bed plate of the machine. The link 50 is provided with a perforation or opening 55 through which extends a pin 56, the upper end of the pin being headed or riveted into the film holder 33 as shown at 58.

A cutting frame 60 is mounted on the bed plate between the fixed head 13 and movable head 14 in the following manner:

61 and 62 designate ears formed on the base plate in which is mounted a pin 63. Pivotally mounted on the pin 63 between the ears 61 and 62 is one end of the cutting frame 60, the forward end of the cutting frame being provided with a handle or gripping member 64. Secured to each side of the cutting frame 60 are movable cutting shears 66 and 67, such shears being secured to the cutting frame by screws 68, the shear 66 being arranged to co-act with the stationary shear plate 23 and the shear plate 67 being arranged to co-act with the shear plate 42 heretofore described, it being understood that the stationary head 13 and movable head 14 are so spaced apart during the cutting operation that the shear plates on the cutter frame co-act with the shear plates on the respective heads as shown in Fig. 4.

For the purpose of preparing the portion of the film to be spliced so that the cement will readily adhere to the film, means are provided for scraping the upper edge of one end of the film, such means consisting of a knife 70 having two cutting edges or blades 71 and 72 pivotally arranged, the knife 70 being cut away in back of each cutting edge as indicated at 73 in Fig. 7. The knife 70 is clamped to a carrier 75 by means of a plate 76, screws 77 extending through such plate through openings 78 in the blade and into the carrier, the openings 78 being of larger diameter than the screws so that the blades may be adjusted. The plate 76 is also for the purpose of limiting the downward movement of the blade and carrier, such plate 76 being arranged to engage and ride upon the upper face of a plate 80 secured by means of a suitable screw 81 to the film clamp 18. The carrier 75 is slidably mounted on a rod 82, such rod 82 being fixed at each end in brackets 83 secured to the cutter frame. Finger grips 85 are formed on the carrier 75 so that the carrier may be readily moved or reciprocated on the rod 82 during the scraping operation of one end of the film.

The swinging movement of the cutter frame with relation to the other parts of the device is limited by means of a projection 87 which engages a stop 88 formed on the ears 61 and 62.

It is desirable for the purpose of obtaining the best results in splicing to slightly heat the film during the splicing operation, and for this purpose I have shown diagrammatically an electric heating element 90 mounted in any suitable manner on the stationary head 13, and a heating element 91 mounted in any suitable manner upon the under side of the film holder 33.

For the purpose of properly spacing the film 35 on the movable head 14 the film holder 33 is provided with pins 94 which project through the perforations in the edge of the film in the same manner and position as heretofore described with respect to the film held by the stationary head.

The operation of splicing the film by the machine above described is carried out in the following manner:

The stationary head 13 and movable head 14 are arranged in the position shown in Fig. 4. The film to be spliced is placed one end as indicated at 17 on the stationary head 13 and the other end as indicated at 35 on the film holder 33 in the movable head 14. The clamps 18 and 36 are then moved into closed position to hold the film in the respective heads. The cutter carriage is then moved downwardly into the position shown in Fig. 4, the shear plates on the cutter carriage cutting the inwardly projecting ends of the film as shown in Fig. 4, which ends appear as shown at "A" in Fig. 8. The carrier 75 is then moved back and forth over a portion of the film 17 which projects inwardly beyond the plate 80, the blades 71 and 72 scraping the upper face of the film so that the inner end of the film 17 appears as shown at "B" in Fig. 8.

It is to be noted in this connection that the carrier 75 is limited in its movement by the brackets 83 so that either one or the other blade of the cutter remains in contact with the film at all times during the scraping operation, either blade being able to ride back upon the film due to the angle of the cut away portion 73 of the blades, thereby preventing the blades from catching in the edges of the film and tearing or cutting the same.

The cutter frame is then moved out of the way of the movable head into the position shown in dotted lines in Fig. 7, and cementitious material applied in any suitable manner to the scraped portion of the film. The movable head is then moved inwardly by means of the lever 52. The first action of the lever 52 results in the link moving the pin 56 which being fixedly mounted on the film holder 33 moves the film holder forwardly.

The film clamp 36 being pivotally mounted on the film holder as heretofore described moves forwardly with the film holder. This forward movement continues until the inner end of the film holder 33 strikes the plate 42 on the bed plate, and the bed plate being pivotally connected by the pin 30 to the movable head, such bed plate and head 14 are moved inwardly. During this inward movement the follower 45 rides upon the cam 44. This causes the film holder 33 to swing upwardly as shown in Fig. 5 upon its pivotal point, the ends of the film at such time being in the position indicated at "C" in Fig. 8. The continued movement inwardly causes the follower to move over the end of the cam thereby permitting the film holder, clamp and bed plate to resume the position shown in Fig. 6, in which position the end 35 of the film is brought down upon the scraped portion of the end 17 of the film, joining or splicing such ends of the film together as shown at "D" in Fig. 8.

The above operation of the parts carried on the movable head, it is understood, is a very simple operation accomplished by the single movement of the operating lever.

After this operation the clamps 18 and 38 are raised and the film removed from the machine, the lever 52 then being operated to bring the movable head and parts carried thereby back to its original position, the follower 45 riding over the cam without raising the film holder due to the pivotal connection of the follower heretofore described.

It is to be understood that the bed plate 31, the film holder 33 and the film clamp 36 carried thereon may be swung upon the point 30 so that access may be had to the interior of the machine if desired.

When the head 14 is returned to its original position as above described it strikes against stops 95 mounted in any suitable manner on the base plate, such stops being so positioned that the shear plate on the head 14 is in proper position to be engaged by the shear plate on the cutter frame.

What I claim is:—

1. A film splicing machine comprising a stationary member arranged to hold one end of the film, a movable member, a film holder on said movable member arranged to swing longitudinally of the film to hold the other end of the film, means for scraping the film, and means for bringing the end of the film held by the film holder toward the stationary head and down upon the scraped portion of the other end of the film.

2. A film splicing machine comprising a stationary member arranged to hold one of the ends of the film to be spliced, a movable member, a film holder on said movable member pivotally mounted to swing longitudinally of the film, means for scraping the upper face of the film held by the stationary member, means for moving the movable member toward the stationary member and means for raising and lowering said film holder during the movement of the movable member to bring the end of the film held by such holder downwardly upon the scraped portion of the film held by the stationary member.

3. A film splicing machine comprising a stationary member arranged to hold one end of the film, means for scraping a portion of the upper face of such film, a movable member, a film holder on said movable member arranged to hold the other end of the film, means for moving the movable member toward the stationary member, and means for swinging the film holder longitudinally of the film to bring the end of the film held by the film holder downwardly upon the scraped portion of the film held by the stationary member.

4. A film splicing machine comprising a stationary member arranged to hold one end of the film to be spliced, a movable member, a film holder pivotally mounted on one end of the movable member, clamping means for holding the other end of the film to be spliced in the film holder, means for cutting the ends of the films, means for scraping the upper face of the film held by the stationary member, means for moving the movable member toward the stationary member, and means for swinging the film holder upwardly then downwardly to bring the end of the film held by the film holder downwardly upon the scraped portion of the film held by the stationary member.

5. A film splicing machine comprising a stationary member arranged to hold one end of the film to be spliced, a movable member, a film holder pivotally mounted on the stationary member, means for holding the other end of the film to be spliced in the film holder, means for cutting the ends of the films, means for scraping the upper face of the film held by the stationary member, means for moving the movable member toward the stationary member, a cam, and a follower on said film holder arranged to travel over said cam whereby the film holder is raised and lowered during the movement of the movable member to bring the end of the film held by such member downwardly upon the scraped portion of the end of the film held by the stationary member.

6. A film splicing machine comprising a base plate, a stationary member mounted on the base plate, a movable member slidably mounted on said base plate, means on the stationary member for holding one end of the film, a film holder pivotally mounted on the movable member for holding the other end of the film, a cutter frame pivotally mounted on the base plate movable between the stationary member and movable member, arranged to cut the ends of the film, means for scraping the upper face of the film held by the stationary member, means for moving the movable member toward the stationary member and means for swinging the film holder upwardly then downwardly during such movement of the movable member to bring the end of the film held by such member downwardly upon the scraped portion of film held by the stationary member.

7. A film splicing machine comprising a base plate, a stationary member mounted on the base plate, a movable member slidably mounted on said base plate, means on the stationary member for holding one end of the film, means on the movable member for holding the other end of the film, a cutter frame pivotally mounted on the base plate, movable between the stationary member and movable member, arranged to cut the ends of the film, a movable blade mounted to reciprocate on the cutter frame arranged to scrape the upper face of the end of the film held in the stationary member, and means for moving the movable member to bring the end of the film held by such member downwardly upon the scraped portion of the film held by the stationary member.

8. A film splicing machine comprising a base plate, a stationary member mounted on the base plate, a movable member slidably mounted on said base plate, means on the stationary member for holding one end of film, means on the movable member for holding the other end of film, a cutter frame pivotally mounted on the base plate, movable between the stationary member and movable member, arranged to cut the ends of film, a rod mounted on the cutter frame, a carrier slidably mounted on said rod, blades mounted on said carrier arranged to engage and scrape the upper face of the end of film held in the stationary member, means for limiting the depth of cutting of the blades, and means for moving the movable member to bring the end of film held by such member downwardly upon the scraped portion of film held by the stationary member.

9. A film splicing machine comprising a base plate, a stationary head on the base plate, a clamping member pivotally mounted on the stationary head arranged to hold one end of the film to be spliced, a movable head slidably mounted on the base plate, a bed plate pivotally mounted on said movable head to swing longitudinally of the film, a clamping member pivotally mounted on the bed plate arranged to swing transversely of the film to hold the other end of the film to be spliced, a cutter frame pivotally mounted on the base plate arranged to co-act with the inner ends of the heads to cut the film, scraping means mounted on the cutter frame arranged to scrape the upper face of the end of film held by the stationary head, and means for moving the movable head toward the stationary head and means for swinging the bed plate upwardly during such movement to bring the end of film held by such bed plate downwardly upon the scraped portion of the other end of film.

10. A film splicing machine comprising a base plate, a stationary head on the base plate, a clamping member pivotally mounted on the stationary head arranged to hold one end of the film to be spliced, a movable head slidably mounted on the base plate, a bed plate pivotally mounted on the movable head to swing longitudinally of the film, a film holder slidably mounted on said bed plate, a clamping member pivotally mounted on the film holder arranged to hold the other end of film to be spliced, means for cutting the ends of film, means for scraping the upper face of the end of film held in the stationary head, means for moving the film holder on the bed plate to bring a portion of the film therein beyond the inner end of the movable head, and means for moving the movable head inwardly to bring the extended portion of the film downwardly upon the scraped portion of the film in the stationary head.

11. A film splicing machine comprising a base plate, a stationary head on the base plate having a longitudinal groove therein arranged to receive a piece of the film to be spliced, a clamping member pivotally mounted on the stationary head arranged to hold the film in the groove, a movable head slidably mounted in the base plate, a bed plate pivotally mounted on the movable head, a film holder slidably mounted on said bed plate having a longitudinal groove arranged to receive the other piece of film to be spliced, a clamping member pivotally connected to the film holder arranged to hold the film in the groove, means for cutting the ends of film, means for scraping the upper face of the end of the film in the stationary head, means for moving the film holder to bring the piece of film therein beyond the inner end of the movable head, and means for moving the movable head inwardly to bring the extended portion of the film downwardly upon the scraped portion of the film in the stationary head.

12. A film splicing machine comprising a base plate, a stationary head mounted on the base plate arranged to hold one piece of film to be spliced, a movable head slidably mounted on the base plate arranged to hold the other piece of film to be spliced, a film holder pivotally mounted on said movable head, means in each head for positioning the film therein, stationary shear plates on the inner end of the stationary and movable heads, a cutter frame pivotally mounted on the base plate, shear plates on the cutter frame arranged to co-act with the shear plates on the heads to cut the ends of the pieces of film, means on the cutter frame for scraping the upper face of the end of the film held in the stationary head, and means for moving the film holder on said movable head to bring the inner end of the film therein downwardly upon the scraped portion of the film in the stationary head.

In testimony whereof, I have hereunto set my hand at Los Angeles, California, this 24th day of March, 1920.

JAMES SLIPPER.